Jan. 9, 1945. H. FINZEL ET AL 2,367,015
APPARATUS FOR SHAPING OBJECTS BY PLASTIC DEFORMATION
Filed Oct. 3, 1940 12 Sheets-Sheet 1
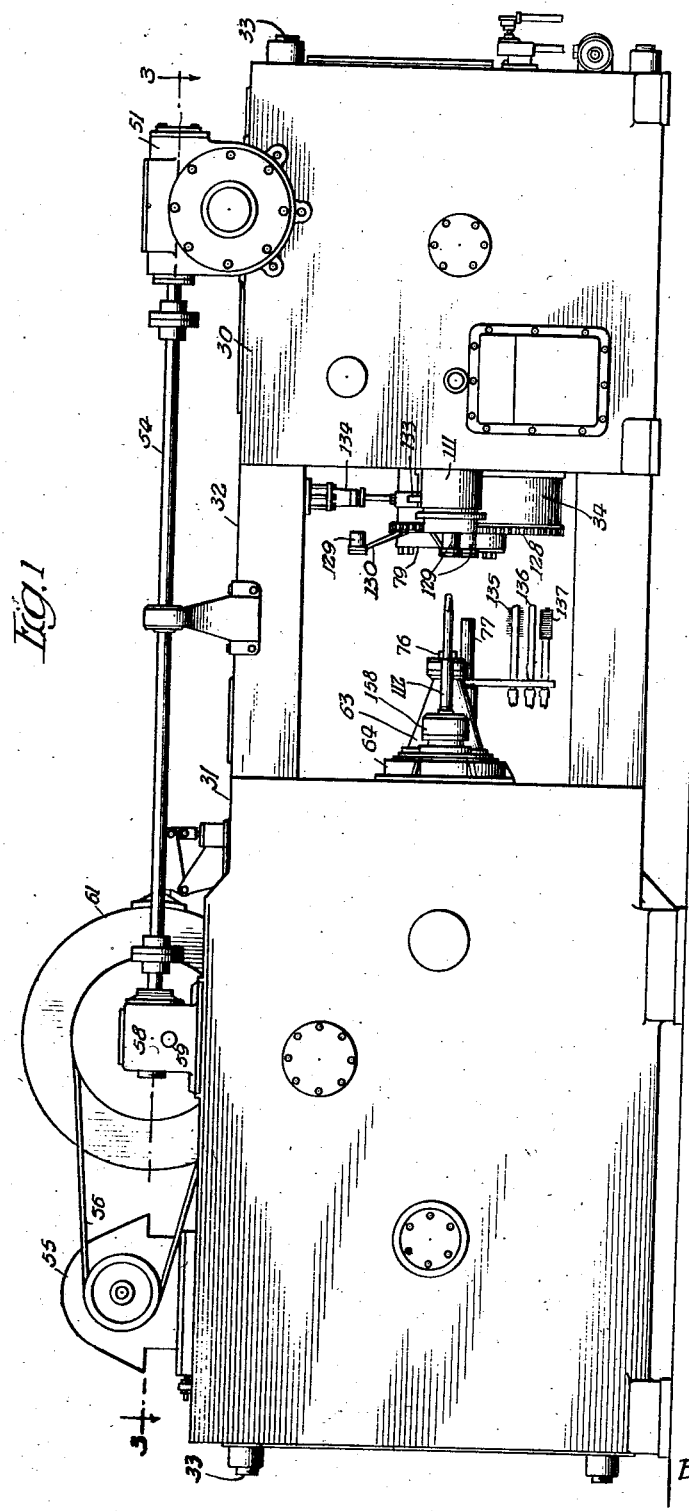
Inventors
Herman Finzel
Heinrich Maykemper
By Jochum
Atty.

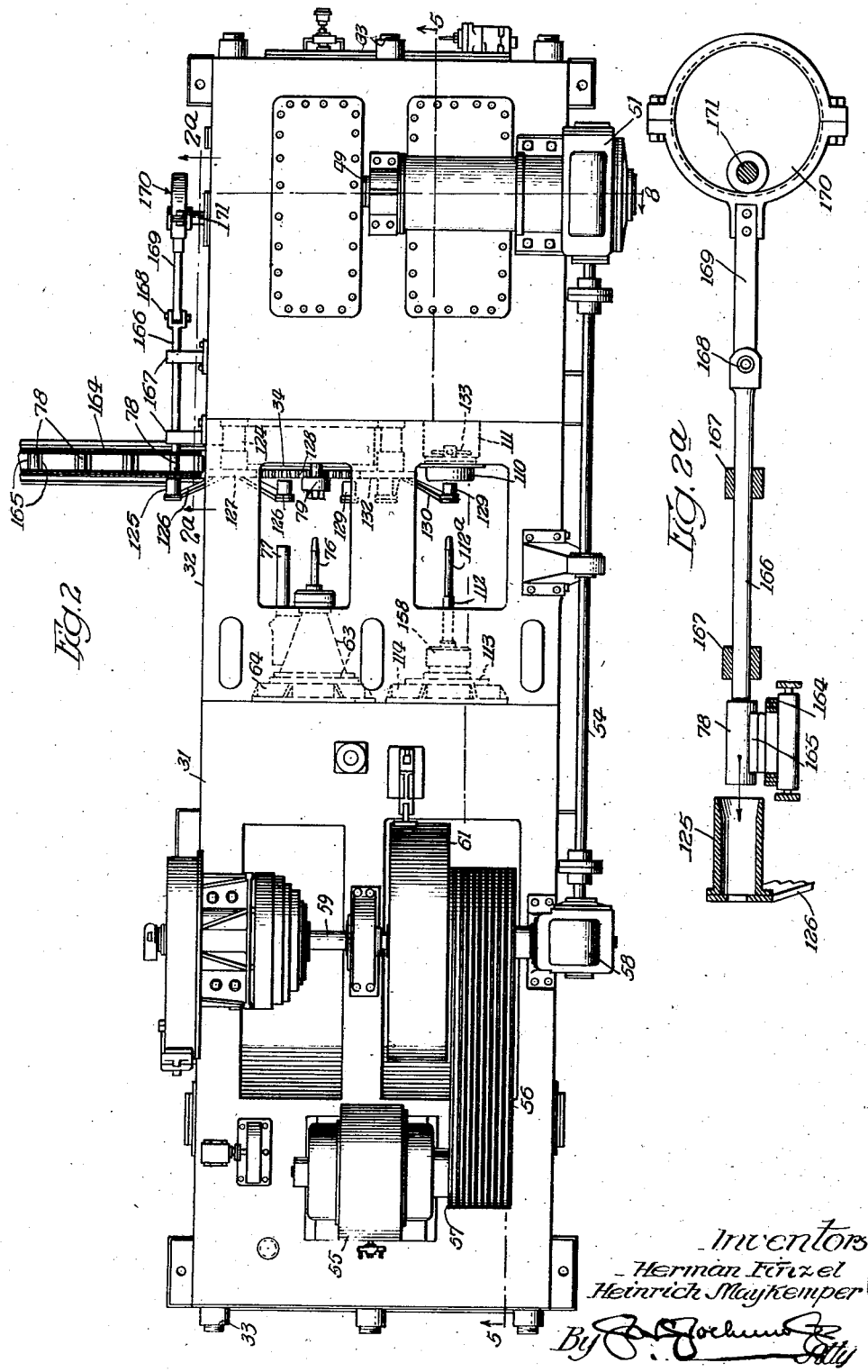

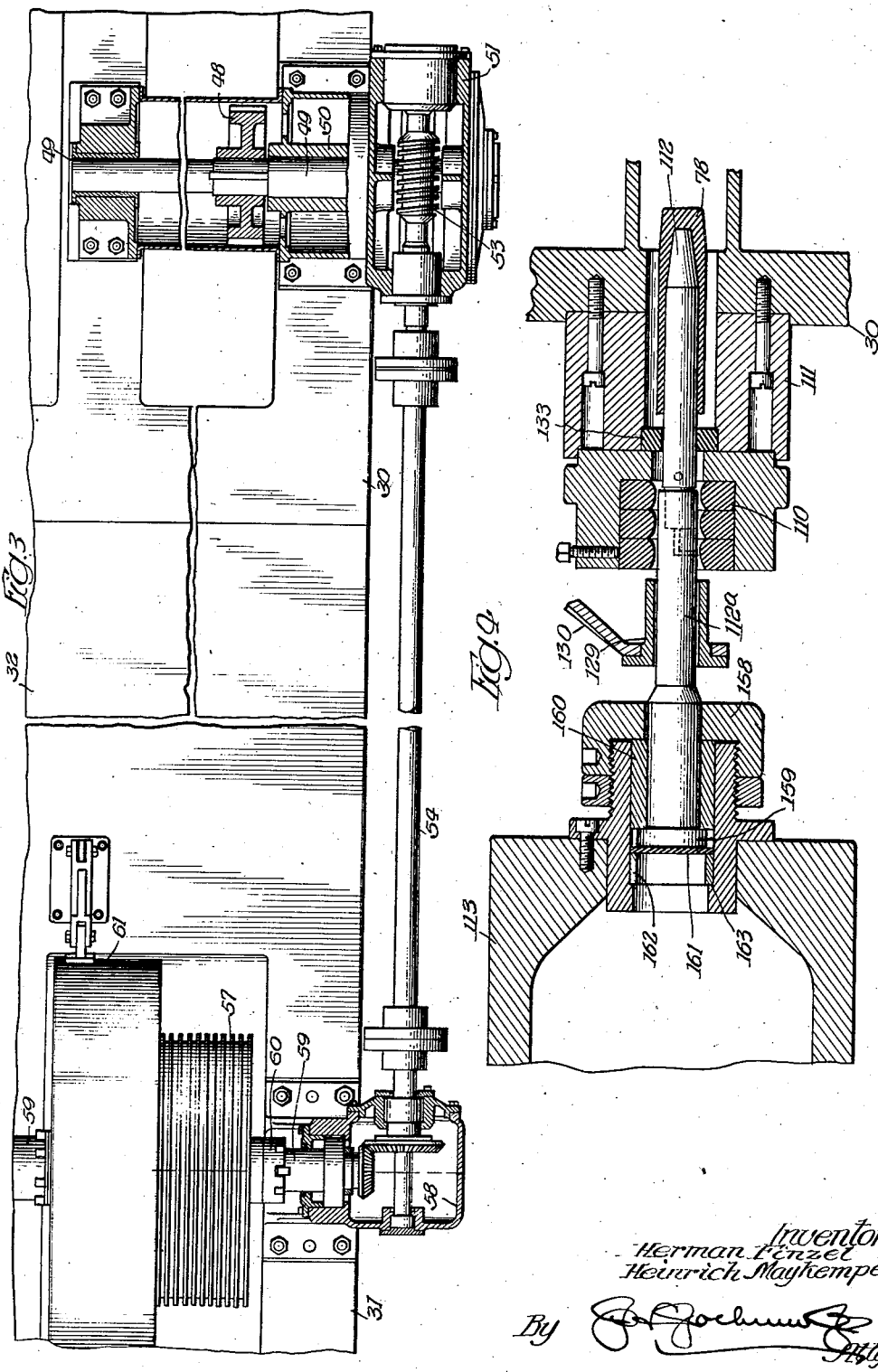

Jan. 9, 1945.     H. FINZEL ET AL     2,367,015
APPARATUS FOR SHAPING OBJECTS BY PLASTIC DEFORMATION
Filed Oct. 3, 1940     12 Sheets-Sheet 4
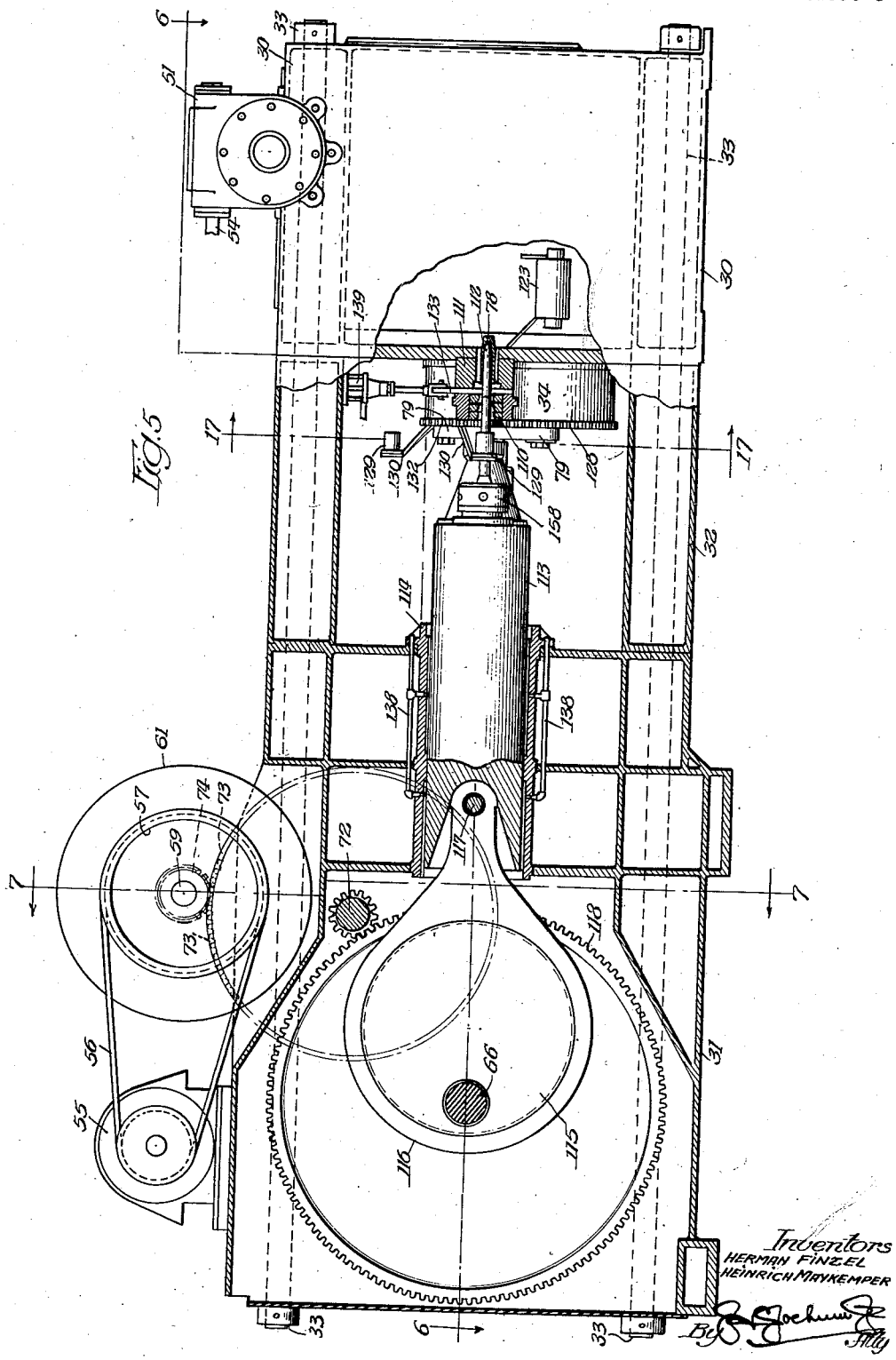

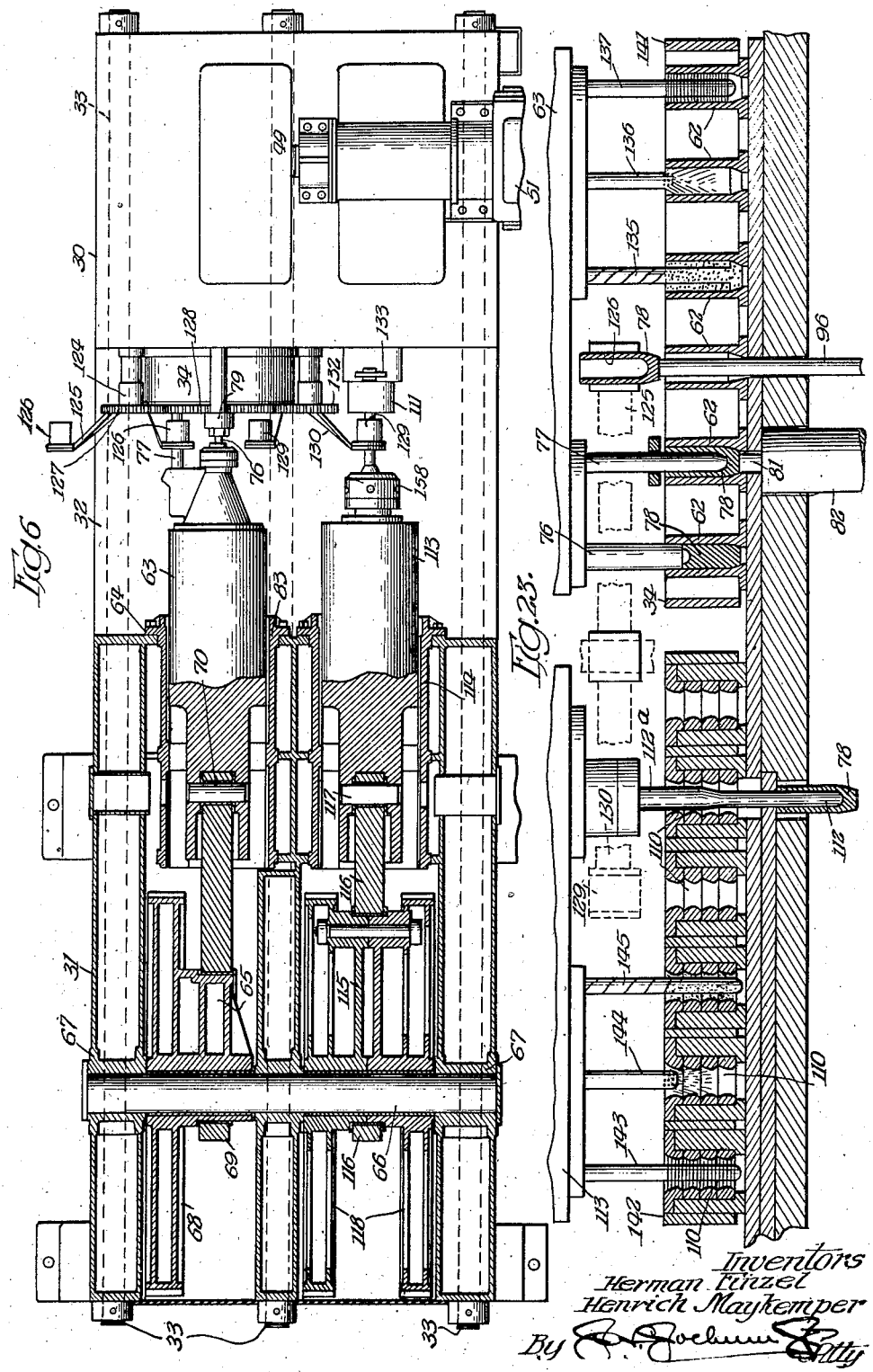

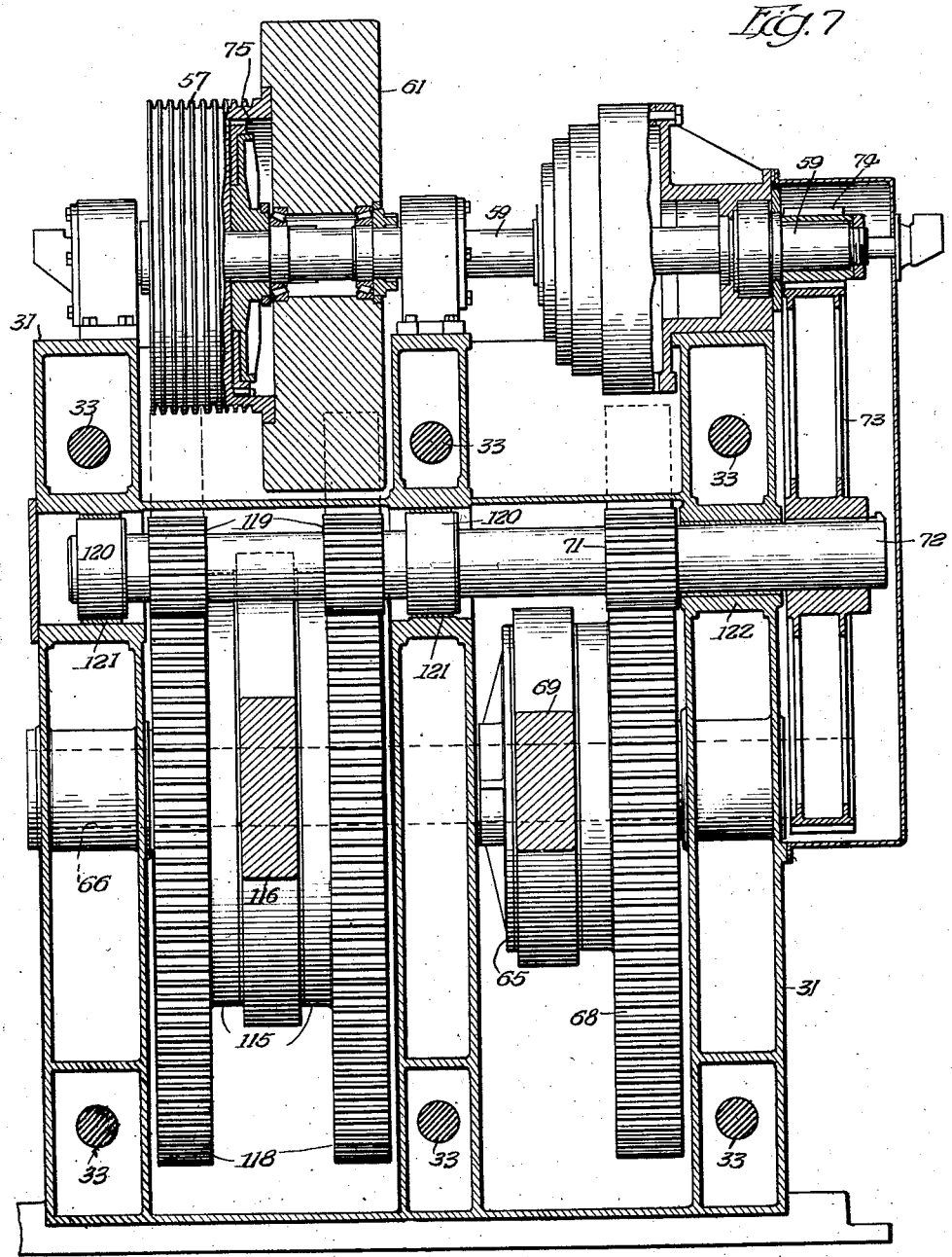

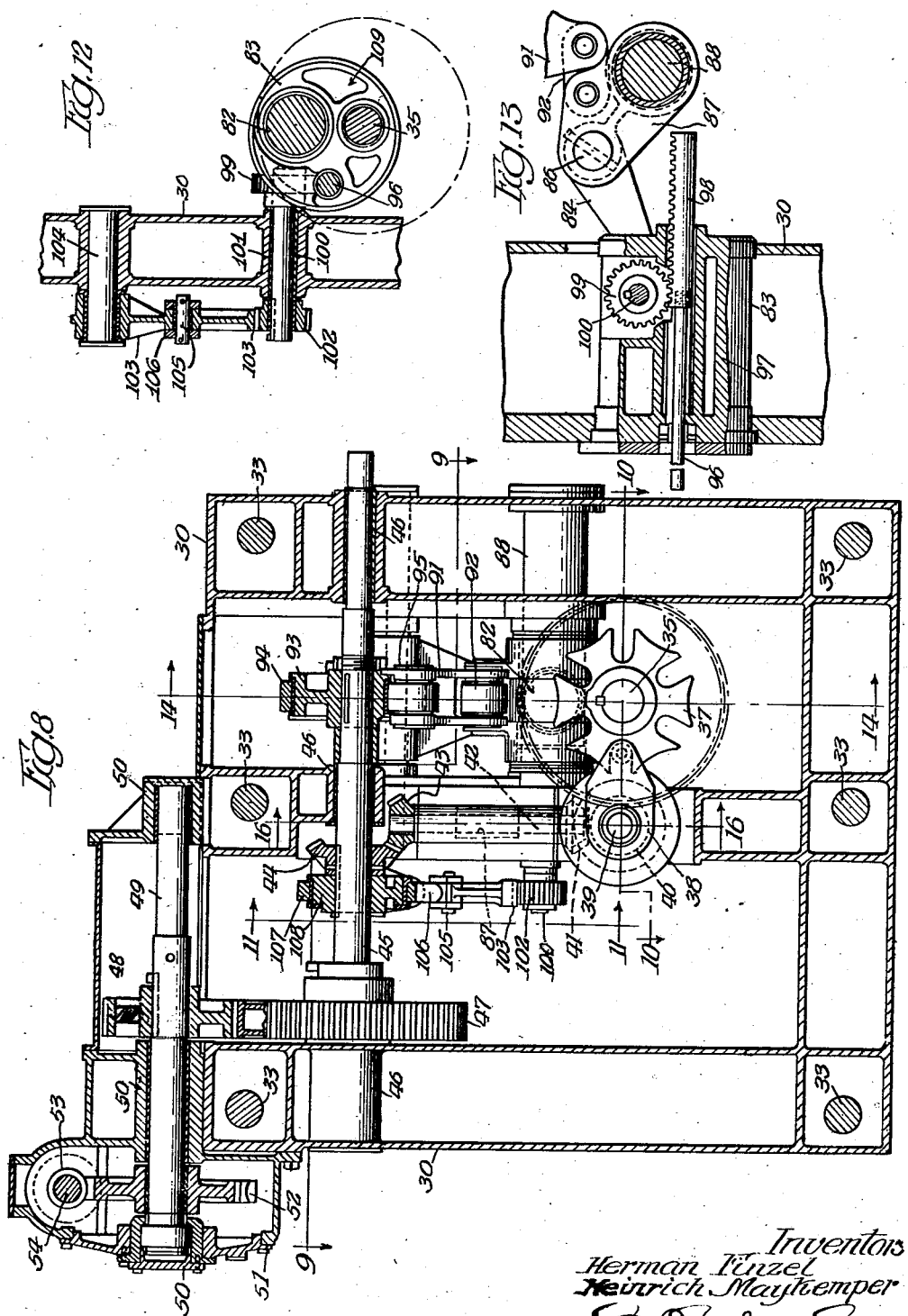

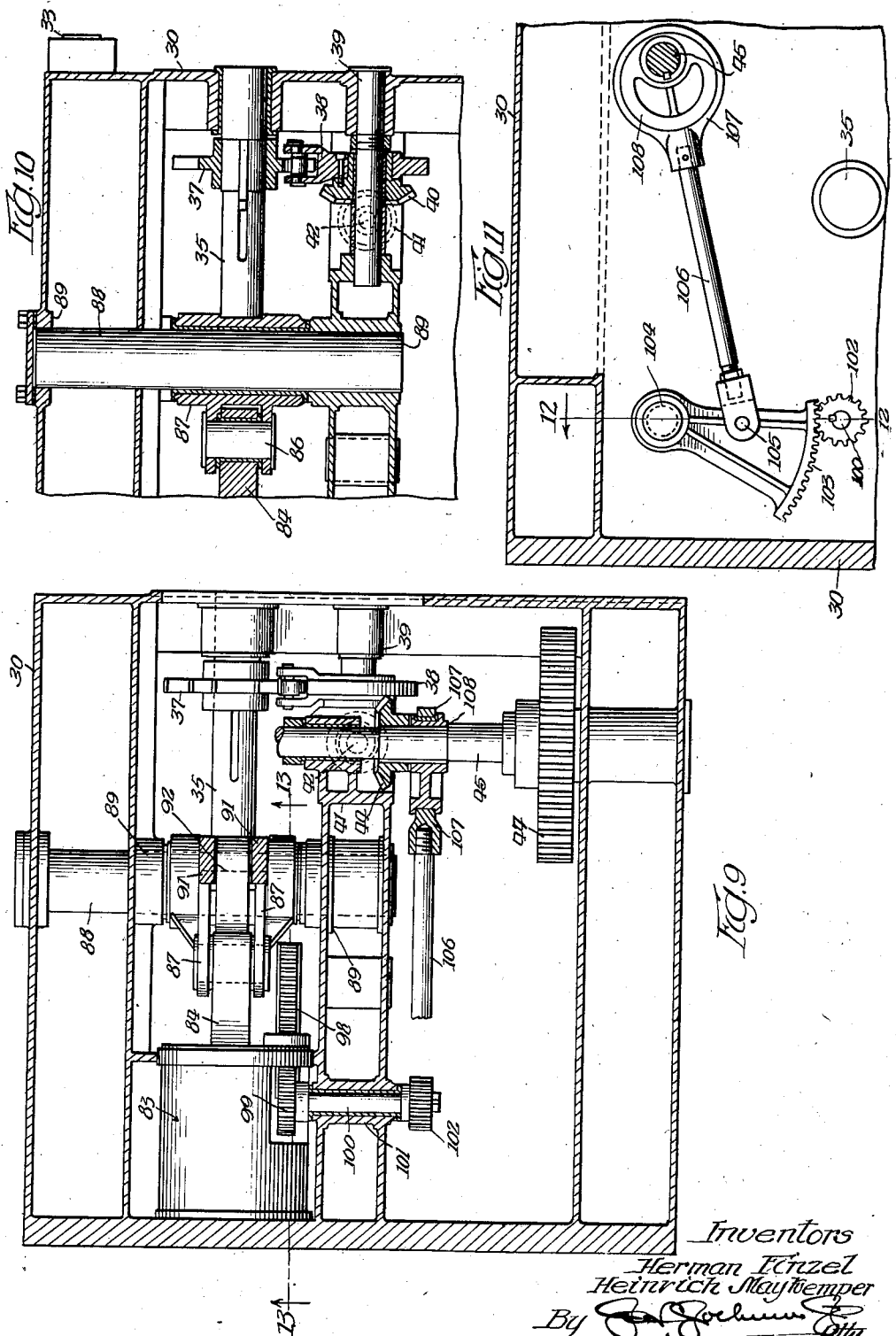

Jan. 9, 1945.   H. FINZEL ET AL   2,367,015
APPARATUS FOR SHAPING OBJECTS BY PLASTIC DEFORMATION
Filed Oct. 3, 1940    12 Sheets-Sheet 9
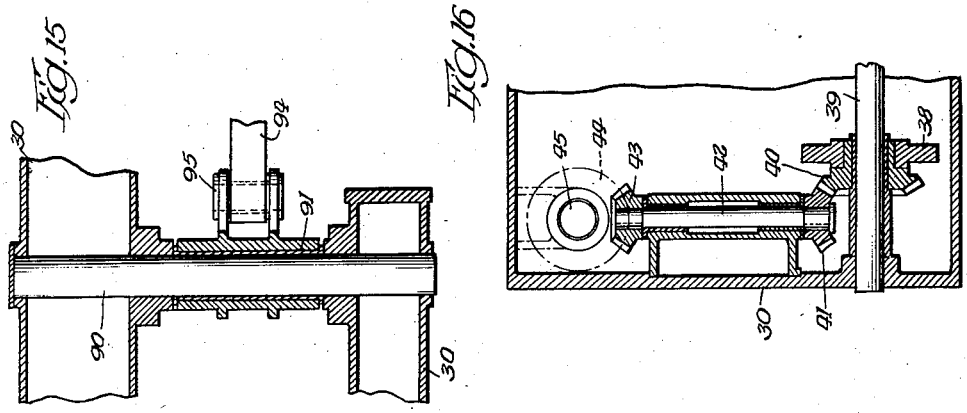
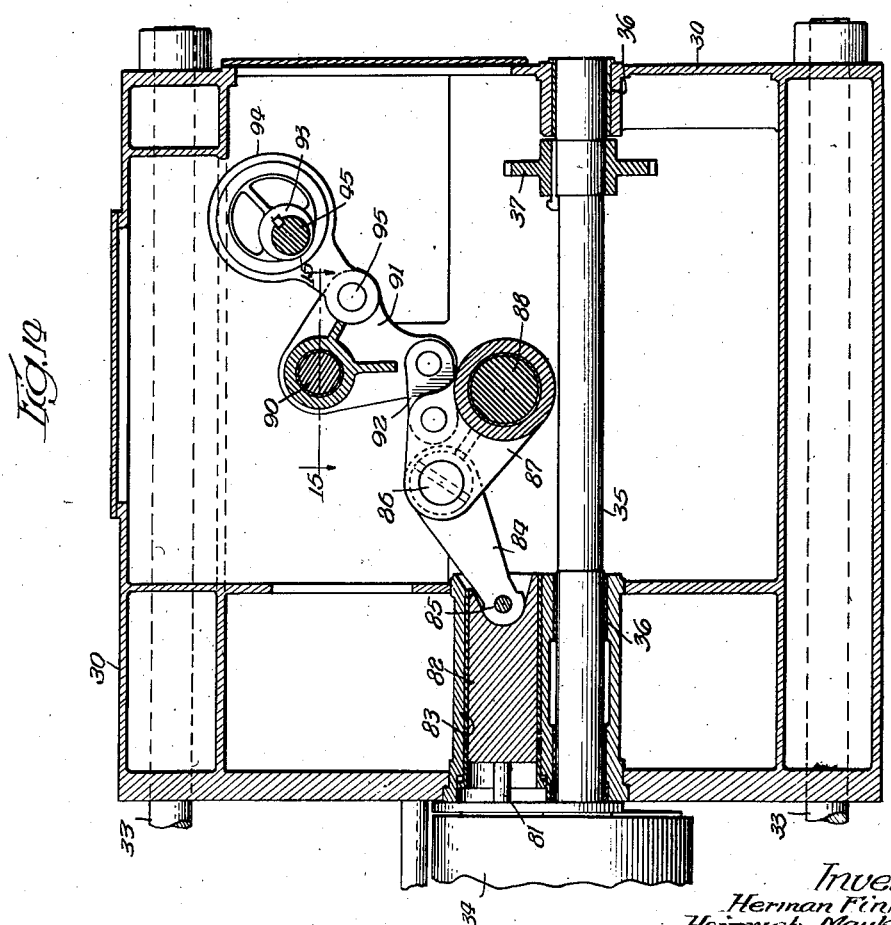
Inventor
Herman Finkel
Heinrich Maykemper
By
Atty Jan. 9, 1945.  H. FINZEL ET AL  2,367,015
APPARATUS FOR SHAPING OBJECTS BY PLASTIC DEFORMATION
Filed Oct. 3, 1940  12 Sheets-Sheet 10
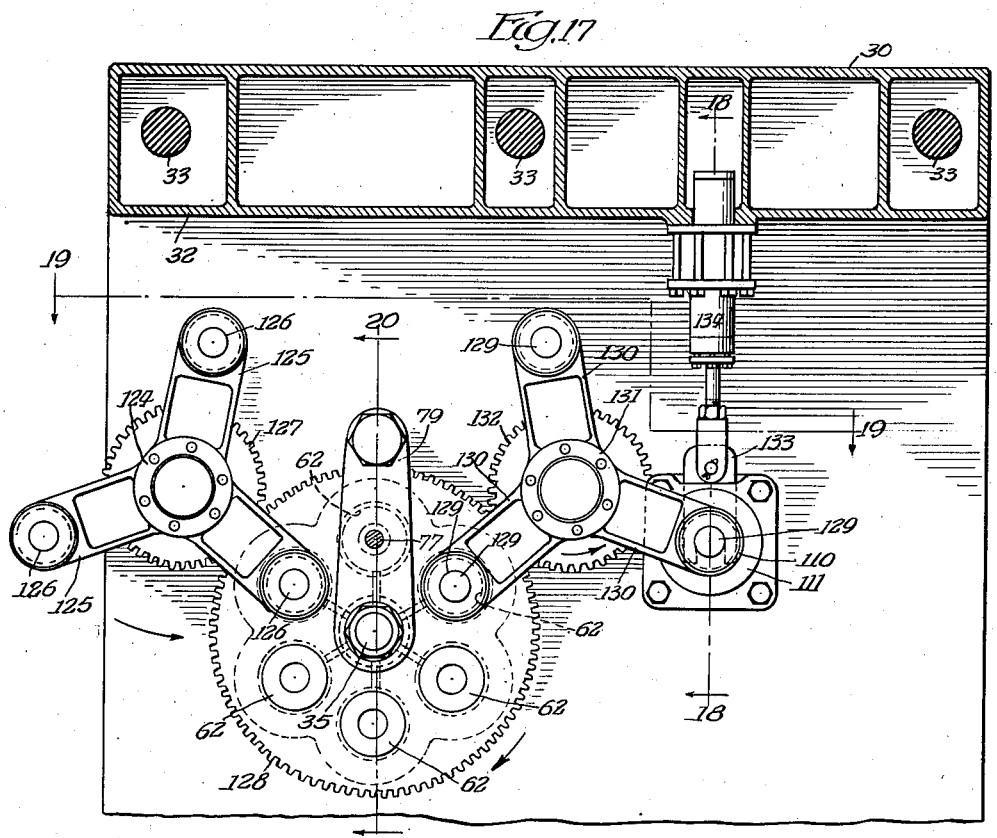
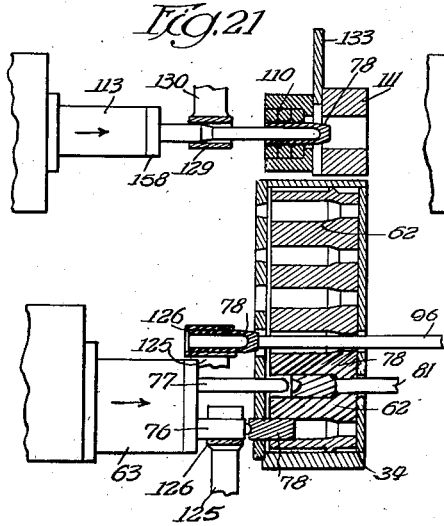
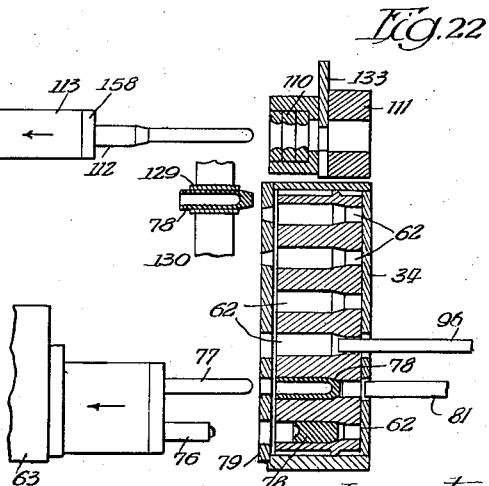

Jan. 9, 1945. H. FINZEL ET AL 2,367,015
APPARATUS FOR SHAPING OBJECTS BY PLASTIC DEFORMATION
Filed Oct. 3, 1940 12 Sheets-Sheet 11
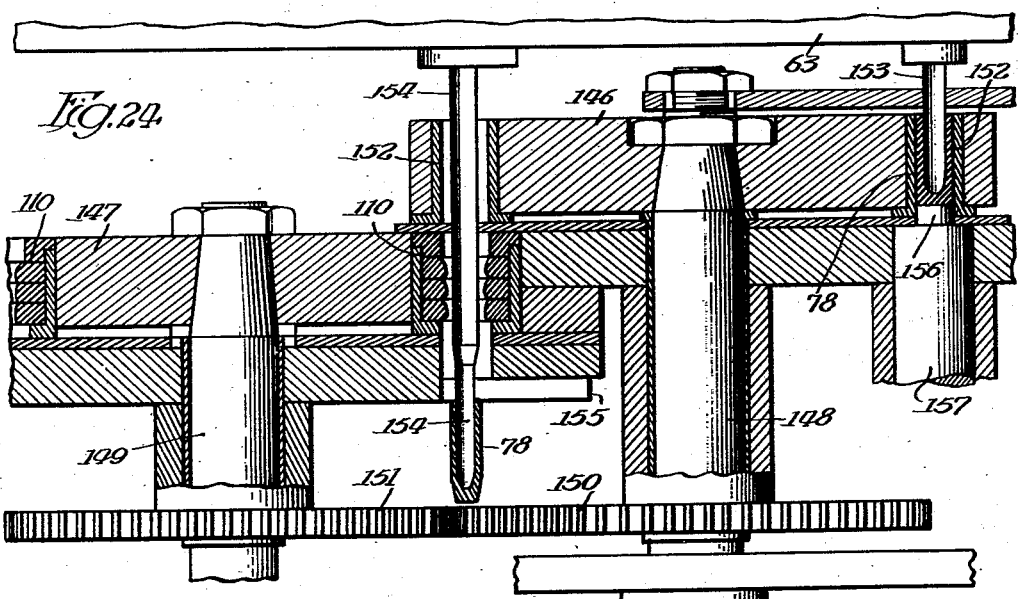
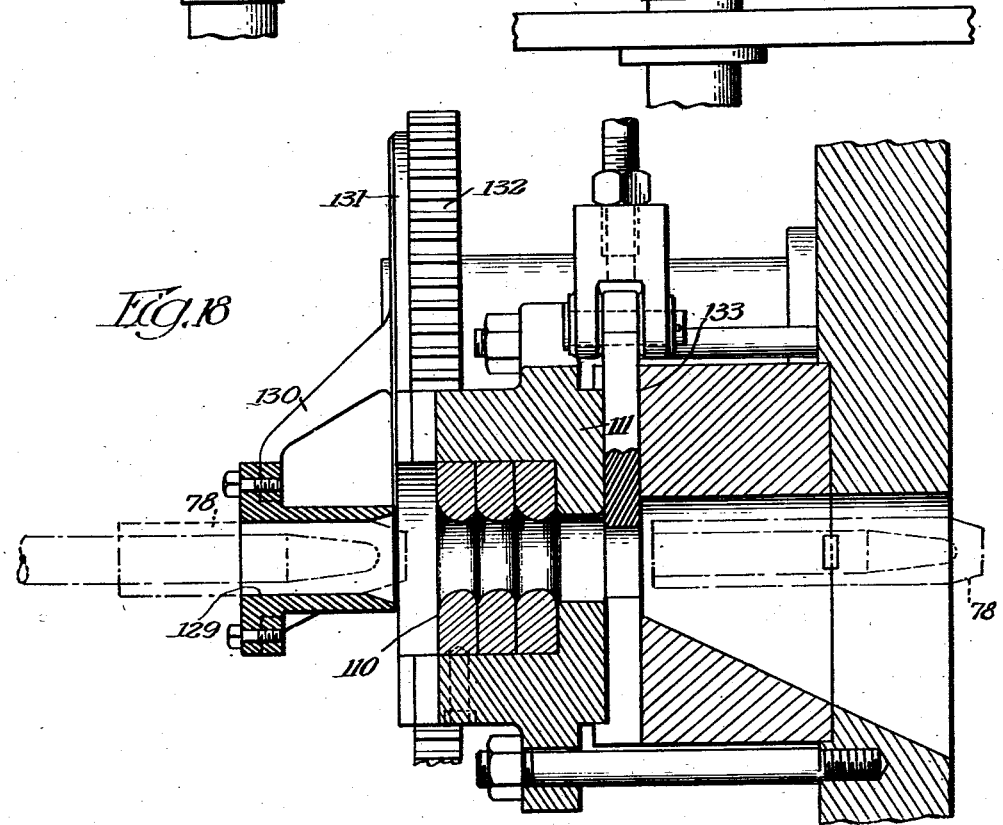
Inventors
Herman Finzel
Heinrich Maytemper
By [signature] Atty Patented Jan. 9, 1945

2,367,015

UNITED STATES PATENT OFFICE 2,367,015

APPARATUS FOR SHAPING OBJECTS BY PLASTIC DEFORMATION

Herman Finzel, Milwaukee, Wis., and Heinrich Maykemper, River Forest, Ill.; said Finzel assignor to Clearing Machine Corporation, a corporation of Illinois Application October 3, 1940, Serial No. 359,600

27 Claims. (Cl. 29—34).

This invention relates to improvements in apparatus for shaping objects which have a volume of material substantially equal to the volume of material in the finished product, by plastic deformation of the work piece such as by means of forging or upsetting the same and then subjecting the resultant product to a drawing operation.

Heretofore in carrying out such steps in the method or process of producing articles in a similar manner, it has been necessary to employ several machines with the attendant objections and expense.

It is one of the objects of the present invention to provide an improved machine for performing in a continuous operation, forging or upsetting of the work, and also a drawing operation thereupon in one and the same machine and in successive stages or steps, all during one cycle of operation of the machine, the power for all of which operations is derived from a common driving element.

A further object is to provide in a machine of this character improved means for cleaning, surface cooling and lubricating the dies or molds to prepare them for a subsequent operation, and at the same time that the drawing and forging operations are taking place.

With the present invention the work piece is fully shaped in the forging stage during one stroke of the plunger of the machine, and the drawing operation is also completed during one stroke of the plunger, the full force of the power of the press or machine being utilized at each work performing station or during each stroke of operation.

The press or machine is constructed as to obtain the necessary or desired pressure at each stage or step in the process.

A further object is to provide, when necessary, improved transfer or conveying mechanism for transferring or conveying the work from one set of dies to another set.

A further object is to provide improved feeding mechanism whereby to feed or supply the work to the machine.

A further object is to also provide, when desired or necessary, improved means for cooling the dies themselves.

A further object is to provide in a machine of this character improved means for relatively shifting the position of the work holders and the tools one with respect to the other, whereby the work may be operated upon by the tools.

A further object is to provide an improved apparatus of the character described, wherein there is embodied improved work holders which are successively supplied with the work and operated to successively advance the work to the successive stations to be operated upon, the work being performed simultaneously by tools mounted upon a reciprocating slide, and during one cycle of operation of the machine, the tools all receiving their power or necessary pressure from a single source. The tools operate simultaneously upon a plurality of pieces of work so that after one piece has passed through the successive stages, there will thereafter be formed a complete article during each cycle of operation of the machine.

A further object is to provide in a machine of this character improved means for making hollow forgings having a closed bottom, and of uniform shape and thickness.

A still further object is to provide an improved machine in which hollow forging may be produced without the use of split dies, as when split dies are employed and they become worn, the inaccuracies of the parts of the die have the effect of leaving a thin rib or flash on the forging, which is objectionable in subsequent operations necessary for finishing the product.

Heretofore in the making of hollow forged pieces of cylindrical shape, it was necessary to turn or grind a forging (or both) to obtain the accurate size. In modern turning operations for high speed production the turning tools which are employed are formed of material which is brittle, and a flash, rib or seam which may be left on the forging by the use of split dies will not successfully permit the use of these brittle high speed cutting tools. With the present invention all of these objections are overcome and a hollow article is forged in a die having an open bottom, and the article is elongated to a length greater than the diameter of the opening in the article.

The bottom of the die is closed by a plunger which prevents the mandrel from entirely penetrating the article, and the mandrel is then withdrawn as the article is forced through the die.

To the attainment of these ends and the accomplishment of other new and useful objects as will appear, the invention consists in substantially the steps in the method and in substantially the features of novelty in the construction, combination and arrangement of the several parts of the machine for carrying the method into operation, hereinafter more fully described and claimed and shown in the accompanying drawings illustrating the invention, and in which Figure 1 is a side view of a machine constructed in accordance with the principles of this invention.

Figure 2 is a top view of the machine shown in Figure 1 with parts broken away.

Figure 2—a is a detail sectional view taken on line 2—a—2—a Figure 2.

Figure 3 is a vertical sectional view, on an enlarged scale, taken on line 3—3 Figure 1.

Figure 4 is an enlarged detail sectional view of one of the reciprocating plungers and a working tool attached thereto.

Figure 5 is a detail sectional view, on an enlarged scale, taken on line 5—5 Figure 2.

Figure 6 is an irregular sectional view taken on line 6—6 Figure 5.

Figure 7 is a sectional view, on an enlarged scale, taken on line 7—7 Figure 5.

Figure 8 is a sectional view, on an enlarged scale, taken on line 8—8 Figure 2.

Figure 9 is a detail sectional view taken on line 9—9 Figure 8.

Figure 10 is a detail sectional view taken on line 10—10 Figure 8.

Figure 11 is a detail sectional view taken on line 11—11 Figure 8.

Figure 12 is a detail sectional view taken on line 12—12 Figure 11.

Figure 13 is a detail sectional view taken on line 13—13 Figure 9.

Figure 14 is a sectional view taken on line 14—14 Figure 8.

Figure 15 is a sectional view taken on line 15—15 Figure 14.

Figure 16 is a sectional view taken on line 16—16 Figure 8.

Figure 17 is a sectional view taken, on an enlarged scale, on line 17—17 Figure 5.

Figure 18 is a sectional view taken on line 18—18, on an enlarged scale, of Figure 17.

Figures 21 and 22 are diagrammatic views illustrating two of the steps in the operation of the machine.

Figure 23 is a diagrammatic view of a modified form of mechanism for carrying this process into operation.

Figure 24 is a diagrammatic view of another form of mechanism for carrying this process into operation.

Figure 19:
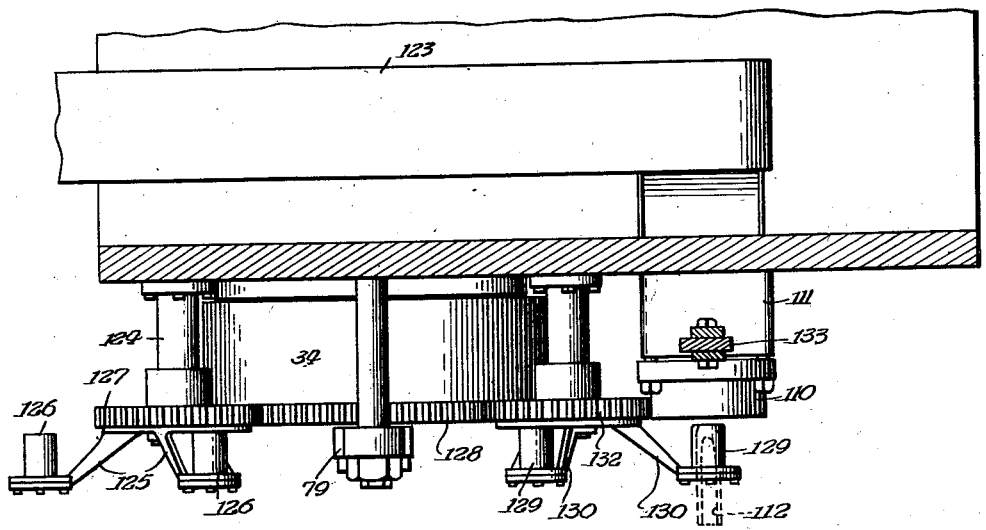
Figure 19 is an irregular sectional view taken on line 19—19 Figure 17.

In the preferred form of the invention the apparatus is shown in the form of a press which may be of any desired or suitable construction but is preferably formed of an end or bed section 30 and an end section 31 which are held spaced from each other by means of a spacer member 32 (see particularly Figure 5) and these parts may be held in assembled relation in any desired or suitable manner such as by means of tie rods 33.

Mounted upon the end section 30 so as to rotate about a horizontal axis is a head or turret 34, the same being connected to a shaft 35 journaled in suitable bearings 36 and which shaft is adapted to be intermittently rotated in any desired or suitable manner such as by means of a Geneva element 37 (see particularly Figure 8) which in turn receives its motion by means of a co-operating element 38 (see also Figure 9) that is secured to a shaft 39 for rotation therewith. The shaft 39 is rotated by means of a gear 40 with which a gear 41 meshes and this gear 41 is secured to a shaft 42 for rotation therewith and carries another gear 43 that in turn meshes with a gear 44 on a shaft 45. The shaft 45 is mounted in suitable bearings 46 and has secured thereto for rotation therewith a gear 47. The gear 47 in turn meshes with a gear 48 carried by a shaft 49 journaled in suitable bearings 50, and carried by this shaft 49 preferably within a suitable housing 51 is a worm gear 52 (see particularly Figure 8) with which a worm 53 on a shaft 54 meshes.

A motor 55 furnishes the power for the operation of the machine and this motor has connection preferably by means of a drive belt 56 and a pulley 57 carried by the shaft 59; a speed reduction gear mechanism 58 forms connection between the shaft 54 and the shaft 59, suitable clutch mechanism 60 being provided between the pulley and the speed reduction gearing.

A suitable brake mechanism 61, if desired, may be provided for controlling the rotation of the shaft 59.

Thus it will be seen that through the medium of the shaft 54 and worm gear 53—52 the shaft 45 will be rotated (see particularly Figure 8) and this in turn through the gear connection 44—43, shaft 42 and gear 41—40, the Geneva movement 38—37 will cause intermittent steps of rotation to be imparted to the shaft 35 to rotate the head or turret 34 intermittently.

The turret 34 is provided with a number of sockets or recesses for the reception of dies 62, any number of which may be provided, and which are arranged concentric to the axis of the turret 34.

In the present exemplification of this invention six sockets and six dies are shown, and these dies are adapted to be successively advanced to different stations for the performance of the operations upon the work and the dies, as will be hereinafter described.

In the present exemplification of this invention one rotating turret 34 is shown and into this turret is fed the work and the operation of deforming the work is performed therein so that all of the forging operations will be performed in this turret by the suitable tools. To that end there is provided a reciprocating slide 63 which is cylindrical in cross-section and slides in a suitable bearing 64. This slide is reciprocated in any suitable manner preferably by means of an eccentric 65 which rotates upon a shaft 66 (see particularly Figure 6), the latter being supported in suitable bearings 67. The eccentric 65 is connected to a gear 68 for rotation therewith and co-operating with the eccentric 65 is an eccentric strap 69 which is pivotally connected, as at 70 to the slide 63 so that when the gear 68 is rotated the slide 63 will be reciprocated.

The gear 68 is rotated by means of a gear 71 secured to a shaft 72 (see Figure 7) to which shaft is connected a gear 73 with which a gear 74 meshes and which gear 74 is carried by the shaft 59 which supports the pulley 57, the pulley being adapted to be connected and disconnected from the shaft 59 by means of any suitable clutch mechanism 75. Carried by the slide 63 are the tools 76—77 (see particularly Figure 20) the tool 77 serving as a means to deform the work 78 in one of the dies 62, while the tool 76 serves to feed the work into the die so that the work will be in position to be operated upon by the tool 77 when the turret is given one step of rotation to position the work to be operated upon by the tool 77.

A stripper member 79 is supported in any suitable manner, and is provided with an opening 80 therethrough into alinement with which the die 62 is adapted to be brought so that the tool 77 can pass through the opening 80 into the die to deform the work 78 therein. This stripper member is so positioned and is of such a configuration that after the work has been placed in one of the dies and the turret 34 is given one step of rotation, the die carrying the work will be in position so that the tool 77 can enter the die and operate upon the work, and as the turret is rotated the die carrying the work will pass under the stripper 79 so as to hold the work and strip it from the tool 77 as the latter recedes.

Figure 20:
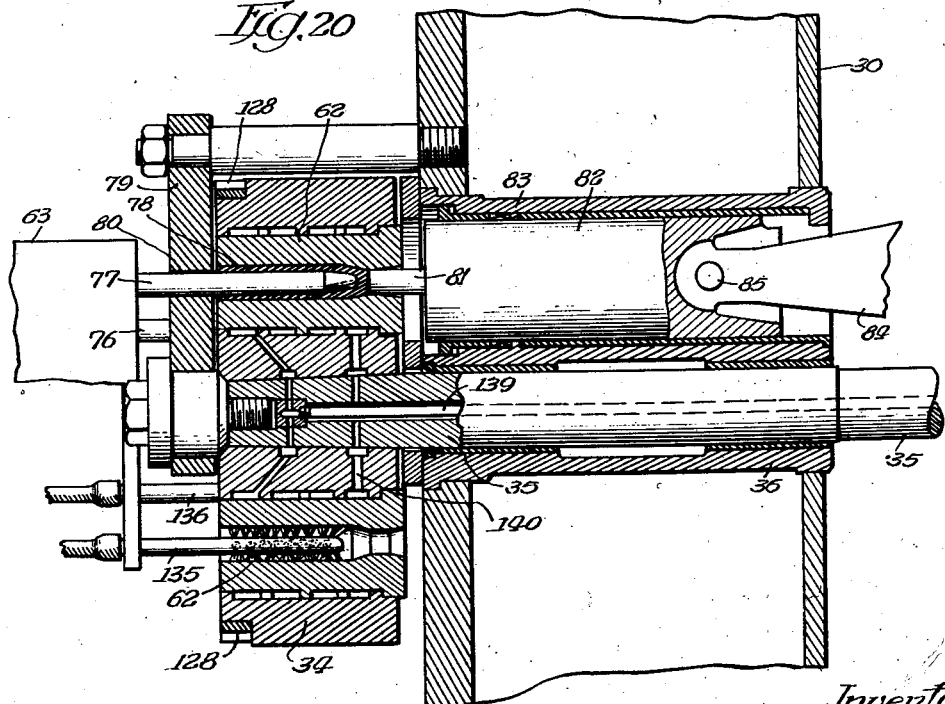
Figure 20 is a sectional view on an enlarged scale taken on line 20—20 Figure 17.

The dies 62 are open bottom dies and are periodically arranged in alinement with the tool 77, and so as to enter the opening in the bottom of the die to serve as a means for locking and centering the turret 34 and also as the bottom of the die in which the material is deformed, is a pin or member 81 that is carried by a slide 82 (see particularly Figure 20). This slide 82 moves in a suitable bearing 83 and is adapted to be reciprocated in any suitable manner such as by means of toggle mechanism comprising a link 84 (see particularly Figure 14) pivotally connected to the slide, as at 85. The other end of the link is pivotally connected, as at 86, to an arm 87 which oscillates about a shaft 88, the latter being supported by suitable bearings 89 (see particularly Figure 10).

Oscillatably mounted upon a suitable supporting shaft 90 (Figure 14) is a rocker member 91 that is connected by means of a link 92 with the arm 87. Secured to the shaft 45 (see also Figure 8) for rotation therewith is an eccentric 93 with which an eccentric strap 94 co-operates. This strap 94 is pivotally connected, as at 95, with the rocker member 91 so that as the shaft 45 is rotated, the eccentric 93 will, through the medium of the eccentric strap 94, oscillate the rocker member 91 and this member 91, through the medium of the link 92, will cause the toggle formed by the members 84—87 to actuate the slide or plunger 82.

Through the medium of the toggle mechanism the slide 82 will be given a period of dwell during the cycle of operation of the machine so as to center and lock the rotatable turret 34 during the operation of the tools upon the work in the dies carried by the turret.

An ejector mechanism is provided for ejecting the work from the forging die so that it may be positioned with respect to a drawing die (which latter will be hereinafter explained) to be forced therethrough to impart the final shape to the article by a drawing operation.

To that end there may be provided an ejector or plunger 96 (see particularly Figures 8 to 13) which operates in a suitable bearing 97 and has connected thereto, or formed as a part thereof, a rack 98. Meshing with the teeth of the rack is a gear 99 which in turn is connected to a shaft 100 mounted in a suitable bearing 101. Secured to the shaft 100 for rotation therewith is a gear 102 with which latter the teeth of a segment 103 mesh. This segment is pivotally supported in any suitable manner such as by means of a shaft or pivot 104 and connected to the segment 103, as at 105, is a bar or rod 106, the other end of which is connected to an eccentric strap 107 which latter cooperates with an eccentric 108 that is secured to the shaft 45 for rotation therewith.

With this construction and when the shaft 45 is rotated, the eccentric 108 will also be rotated and through the medium of the eccentric strap 107 and bar 106 the segment 103 will be oscillated about its pivot 104 causing the gear 102 to operate upon the rack 98 of the ejector 96 to reciprocate the latter in its bearing and thereby force the ejector into the die carried by the turret 34 to eject the article therefrom and to then be retracted or withdrawn from the die so as to permit the turret to be angularly moved another step of its operation.

This operation of the ejector is rendered possible by reason of the fact that the toggle mechanism which reciprocates the slide or plunger 82 that centers and locks the turret against movement, will have a period of dwell in its operation.

The bearing 83 which serves as a bearing for the slide or plunger 82, the shaft 35 which rotates the turret, and the ejector 96, as well as all of the other bearings in the machine, where possible, may be hollow for the purpose of lightness and also to provide a means whereby a cooling fluid may be circulated therethrough.

In the present exemplification of this invention there is also provided a drawing die 110 (see particularly Figures 5 and 6) which is mounted in a stationary head 111 and co-operating with this die is a tool 112 which is mounted upon a slide or arm 113, the latter being preferably circular in cross-section and slidably mounted in a bearing 114. This slide 113 is operated by means of the eccentric 115 rotatably mounted upon the shaft 66 and co-operating with the eccentric is an eccentric strap 116 that is pivotally connected as at 117 with the slide 113. This eccentric may be of any desired construction and may be comprised of two sections (see particularly Figure 6) each of which sections is connected with a gear 118 for rotation therewith and which gears are also rotatably mounted upon the shaft 66, the eccentric being preferably located between the gears.

The gears 118 are rotated by means of gears 119 (see particularly Figure 7) which are connected to the shaft 72 and the shaft 72 may be provided with bearing surfaces 120 which rotate in suitable bearings 121, and an additional bearing 122 may be provided for the shaft if desired.

After the work has been forged in the forging die, it is removed from the forging die and conveyed to a position that it will enter the drawing die 110 so that when the slide 113 is operated, the tool 112 will force the work through the drawing die 110, which latter may be of any configuration and construction according to the shape to be given to the finished article, and will be forced from the die and discharged upon a suitable conveyor 123 (see also Figure 19) to be conveyed away.

Thus it will be seen that upon operation of the shaft 72 the gear 68 and eccentric 65 which imparts a reciprocatory movement to the slide or ram 63 carrying the forging tool, and the gears 118 and eccentric 115 which control the reciprocatory movement of the slide 113 and the drawing tool 112, will be rotated so that after the machine has been operated sufficiently to forge and draw one of the work pieces, a completed work piece, including the positioning of the work piece into a forging die, forging the work piece, removing the work piece from the last mentioned die, positioning the same to be operated upon the work piece, will be performed during each cycle of operation of the press.

The feeding mechanism for the work piece may be of any desired or suitable construction but in the present exemplification of this invention and as shown more clearly in Figures 17 and 19 there is provided a rotatably mounted member 124 which is preferably provided with arms 125 each having a seat 126 therein. This member 124 is adapted to be rotated by means of a gear 127 connected thereto and which gear meshes with a gear 128 that is secured to the turret or head 34 so that when the turret is rotated and given its step by step movement a similar movement will be given to the member 124 in the direction of the arrow indicated in Figure 17 so as to move one of the arms 125 into a position in alinement with one of the dies 62 in the turret head, and also into a position that the feeding or positioning tool 76 (see also Figure 21) will remove the work piece 78 from the seat 126 in the feeding mechanism 124 and position it in one of the dies or molds 62 in the turret head.

When the slide 63 is retracted, the tool 76 will also be retracted so as to permit the feeding mechanism to be given another step of rotation upon a similar movement of the turret, and at the same time the member 124 will be moved into a position to receive another piece of work.

The arms 125 are provided so as not to interfere with the operation of the mechanism and so as to move the seats 126 into and out of position.

After the work has been operated upon by the tool 76 and the latter has been withdrawn, the turret 34 is then given one step of rotation so as to position the work in the die or mold to be operated upon by the tool 77 and deformed thereby. During the next step of receding movement of the slide 63 and when the turret is turned another step, the deformed work will then be in a position to be ejected from the die by the ejector 96. When thus ejected the work will be positioned into a seat 129 in the arm 130 of another conveying member 131 which is also rotatably mounted and is provided with a plurality of the arms 130 each having a seat 129 therein.

This conveying member 131 is also rotated by the gear 128 which meshes with the gear 132 connected to the member 131 and as the turret 34 to which the gear 128 is connected is given an intermittent or step by step movement, the conveying member 131 will be given a similar movement.

After the work has been removed from the turret by the ejector 96 and positioned in the seat 129 in one of the arms 130 of the conveying member 131 the work will then upon another step of rotation of the member 131 be positioned to be forced through the drawing die 110 in the head 111 and will be operated upon by the tool 112 carried by the slide 113.

A stripper plate 133 may be provided for stripping the work from the drawing tool 112. This stripper plate may be of any desired construction and may be operated in any desired or suitable manner so as to be moved into and out of position at the proper time in the cycle of operation of the machine, but is preferably operated by fluid actuated means diagrammatically illustrated as at 134. With this form of the invention it will be manifest that the power mechanism for operation upon the work at all stages in the operation of the mechanism will be derived from a single source and the full power will be exerted at each stage of operation upon the work.

By the arrangement of the dies in the turret head in the manner as above described and by referring to Figure 17 of the drawings, it will be seen that operations are being performed by the work simultaneously in only three of the dies and that the remaining dies being below the other dies, they will be in a position to have operations performed thereon simultaneously with the operation upon the work in the remaining dies.

This is advantageous because with such an arrangement the idle dies may be prepared for subsequent operation, that is, they may be cleaned, cooled and lubricated. This may be accomplished in any suitable manner such as by means of tools or implements 135—136—137 (see particularly Figure 23). The tool 135 operates to clean the die, while the tool 136 operates to cool the die, and the tool 137 to lubricate the die. These tools 135 to 137 are preferably mounted upon the slide 63 which carries the tools 76—77 and are adapted to be successively inserted into and removed from the dies while the turret 34 is at rest and subsequently when the turret is moved one step to position additional dies with respect to the tools 135—136—137.

By arranging the dies which are idle and which are being prepared for future operations below the dies in which the work is being operated upon, it will be manifest that foreign particles which are removed from the dies which are being conditioned will not drop into the dies in which the work is being performed.

Any suitable means may be provided for supplying the work to the conveyor 124 at the loading station. The bearings for the slides may be provided with a lubricant in any desired or suitable manner and from any suitable source preferably through the medium of pipes 138 (see particularly Figure 5) so as to form a protecting film of lubricant about the respective slides.

It is thought that the operation of this form of the invention will be clearly understood from the foregoing but briefly stated it is as follows, reference being had more particularly to Figure 17 and the diagrams shown in Figures 21 and 22.

The work is supplied to the conveying member 124 at the loading station in any suitable manner by inserting the same in one of the seats 126. Upon operation of the machine and when the slides 63 and 113 are retracted, the turret will be given one step of rotation. This movement will be transmitted to the conveying member 124 to move the piece of work which has been inserted at the loading station, into position with respect to one of the dies in the turret.

Upon movement of the slide 63 in the proper direction, the tool 76 will remove the work piece 78 from the conveying member 124 and position the same in one of the dies 62 in the turret 34. The slide 63 will then be moved backwardly and another step of rotation will be imparted to the turret causing a similar movement to be imparted to the conveying mechanism 124. This will move the turret head to a position that the work piece 78 that has been inserted by the tool 76 into one of the dies will be in position to be operated upon by the tool 77.

At the same time the slide 82 will be moved forwardly so that the projection 81 on the end thereof will enter the open bottom of one of the dies 62 to form a bottom for the die and also to center and lock the turret head against further operation. The slide 63 will then be moved forwardly to cause the tool 77 to operate upon the work 78 and deform the latter with a continuous pressure. At the same time the tool 76 will be inserting another piece of work 78 into another die.

Upon the backward movement of the slide 63 the tool 77 will be withdrawn and the work will be stripped therefrom by the stripper 79, the slide 82 being also retracted so as to unlock the turret head. The turret head will then be given another step of rotation so as to position the die which contains the deformed work, in alinement with the ejector 96 so that the ejector will remove the forged piece of work and insert it into the carrier member 130 so that upon the next step of rotation of the latter, the forged piece of work will be moved into position in alignment with the drawing die 110.

The slide 113 advancing will then cause the tool 112 to remove the work from the carrier arm 131 and force the same through the die 110. When the slide 113 is moved backwardly the work will be stripped from the mandrel 112 by the stripper plate 133. It is of course to be understood that all of these parts operate simultaneously and in synchronism.

Upon the forcing of the forged work through the drawing die it will be manifest that upon each operation of the press thereafter, a complete article will be formed.

As the work is being operated upon in the dies 62, the remaining dies will be in position so that the cleaning and preparing tools will enter thereinto and perform their operations simultaneously with the forming of the work in the other dies.

The turret head may be cooled in any desired or suitable manner preferably through the medium of a pipe or passage 139 (see particularly Figure 20) extending through the shaft 35 and with which pipe or passage, passages 140 communicate to convey the lubricant to the bearing surfaces.

In the form of the invention shown in Figure 23 two rotating turret heads 141—142 are provided and are rotated in any desired or suitable manner simultaneously either by being geared together or by the provision of any other suitable driving means. In this form the dies for the deforming or forging operations are located in one of the turret heads while the drawing dies 110 are located in the other turret head 142.

Also in this form of the invention cleaning and preparing tools 143—144—145 may be provided for the drawing dies and these tools are mounted upon or carried by the slide 113 while the cleaning and preparing tools for the forging dies are mounted and carried by the slide 63. Similar conveying, feeding and transferring mechanism may be provided for this form of the invention.

In the form of the invention shown in Figure 24 two turret heads 146—147 are provided, the turret head 146 being connected to the shaft 148 for rotation therewith while the turret head 147 is connected with a shaft 149 for rotation therewith and these two turret heads are simultaneously rotated by intermeshing gears 150—151 secured to the respective shafts 148—149.

In this form of the invention the forging or deforming dies 152 are carried by the turret 146 and the deforming tool 153 is connected to and carried by the slide 63.

The drawing dies 110 are carried by the turret head 147 and these turrets 146—147 are located in different planes so that a portion of one will overlap the other and so that at the proper time in the cycle of operation of the machine one of the forging or deforming dies 152 wil be brought into register with one of the drawing dies 110 so that the tool 154 which forces the forged work through the drawing die 110 will serve to eject or remove the forged work from the die 152 and force the same through the drawing die 110 on the same stroke of the plunger or slide 63. In this form of the invention a stripper plate 155 may be provided for removing the work 78 from the tool 154.

The method carried out by this form of the invention is the same as with the other forms of the invention and the turret head 146 will be centered and locked in position by means of a projection 156 on a slide 157 which corresponds with the slide 82 of the form of the invention shown in Figure 20.

With this invention the plungers and rods are all cylindrical in cross-section and move in cylindrical bearings which latter are cylindrical borings in the press frame throughout the entire length of the bearings. They are of extended length and are lubricated by forced feed so as to provide a film of oil between the periphery of the plunger and the bearing surface so that metal will not contact metal as the plungers move through the bearings.

The operations are performed in sequence during one cycle of operation of the press and during the different steps of the formation of the final product the full force or power of the press is utilized at each station or during each step of operation. The forging or pressing of the slug or work is done with one working stroke of the press and there are provided corresponding press dies to form a hollow body during the same time and stroke of the machine. The drawing tool or mandrel is of a greater length than the forging tool, that is, the operation of drawing is of longer duration than the operation of forging. These are, however, accomplished in the same stroke of the plunger from a common driving means and the strokes of the respective pistons or plungers are commensurate with the work to be formed but are driven from a common driving means.

All of the operations upon the work are performed in one and the same press during a single cycle of operation and the press is so adjusted or constructed as to obtain the desired or necessary pressure at each step or stage in the entire process.

The means for cleaning the die may be a mechanical means such as a brush or a blast of air or fluid or other means which will accomplish the desired result; after the die has been thus cleaned, it is then subjected to a cooling operation, that is, a surface cooling, and such surface cooling may be effected either by air or liquid.

The next stage in the preparation of the die is the lubrication thereof and mechanism is provided for coating the surface of the die with a lubricant applied in any suitable manner either by wiping operation, flowing operation, or in any other suitable manner, and if necessary in the cleaning, cooling and lubricating stages there may be pipes or injector nozzles which may be inserted into the dies for that purpose.

In addition to the steps of cleaning, cooling and lubricating, the dies may be encased in a housing or the walls of the die may be hollow, or any other suitable provision may be made whereby a cooling medium, such as air or liquid, may be circulated about the dies for a general cooling of the structure.

All of the parts are arranged to operate in synchronism and the process is a continuous process, the work or slug being first operated upon to be deformed by a forging operation in suitable forging dies, then it is removed from the forging dies and forced through a drawing die, all in one cycle of operation of the press.

The turrets are preferably arranged to rotate on horizontal axes but it must of course be understod that any other arrangement suitable to accomplish these desired results may be resorted to.

In order to protect the tools against damage in the event that undue resistance should be encountered when the tool is operating upon the work, a frangible or yieldable connection may be provided between the tool and the plunger.

One of such connections is shown clearly in Figure 4 of the drawings.

The plunger 113 is hollow and may be provided with a cap plate 158 through which the tool or mandrel 112 passes, the tool or mandrel being provided with a head 159. A packing or bushing 160 encompasses the tool or mandrel within the plunger and is disposed between the head 159 and the cap plate 158. A frangible or shear plate 161 rests against an annular member or collar 162 also within the plunger and abuts a shoulder 163. The internal diameter of the collar 162 is greater than the external diameter of the head 159 of the tool or mandrel and the plate 161 is of such consistency or strength that under normal conditions and during the operation of the plunger the tool or mandrel will engage and operate upon the work. When, however, abnormal conditions or abnormal resistance is created upon the tool or mandrel by the work, the plate 161 will be ruptured by the tool or mandrel as the advancement of the tool with the plunger will be arrested. The further result will be that the tool or mandrel will telescope into the plunger.

The cap plate 158 is removable so as to permit of the replacement of the plate or element 161.

If desired, the tool or mandrel proper 112 may be secured to the end of a supplemental plunger 112a on the other end of which is provided the head 159. In this instance it is the supplemental plunger that telescopes into the plunger through the cap 158.

The material or slugs 78 may be fed to the machine in any desired or suitable manner, such as by means of a conveyor 164 (see Figures 2 and 2—a) and upon which conveyor may be arranged suitable holders or seats 165 in which the slugs may be placed. As the conveyor is operated, the slug or work is fed by the conveyor to the feeding station, that is, to a position that it will be in alinement with one of the work holders or seats 125 on the work carrier.

Arranged at this point or station is suitable mechanism for removing the slug or work from the conveyor and inserting it into the seat 125. A suitable and efficient means for accomplishing this result embodies a plunger 166 mounted to move in suitable guides 167. The end of the plunger may be pivotally connected, as at 168, to an eccentric strap 169. With this eccentric strap an eccentric 170 co-operates and the eccentric is operatively connected to a shaft 171 of the machine so that the plunger 166 will operate in timed relation with the other parts of the mechanism. Obviously any other form of feeding mechanism may be employed.

While the preferred form of the invention has been herein shown and described, it is to be understood that various changes may be made in the details of construction and in the combination and arrangement of the several parts within the scope of the claims, without departing from the spirit of this invention.

What is claimed as new is:

1. In an apparatus for completely shaping by plastic deformation and by continuous operation and in the same machine, an object from a billet having a volume of material substantially equal to the volume of material in the finished product, a die for receiving the billet, a piercing implement, means for forcing the implement into the billet to expand the later while it is maintained substantially against extrusion to produce from the billet a tubular formation having a closed end, a separate drawing die, means to present the said formation to the drawing die, means to force the tubular formation through said drawing die to extrude the material and to impart to the said formation its final shape, the last recited means exerting its pressure upon the product from within the cavity therein, and mechanism operating to cause all of the aforesaid means to perform their functions uninterruptedly during one cycle of operation of the apparatus.

2. In an apparatus for completely shaping by plastic deformation and by continuous but successive steps of operation and in the same machine, an object from a piece of work having a volume of material substantially equal to the volume in the finished product, a die, means for deforming the material in said die by pressure simultaneously exerted upon opposite faces of the work, means for hollowing out or initiating a tubular formation of the work having a closed bottom, the last said means operating to expand the material by pressure exerted from within and while the material is substantially maintained against extrusion, a separate drawing die, means for presenting the work to the drawing die, means for forcing the tubular formation through said drawing die to impart to the product its final shape, by pressure applied to the said formation solely within the cavity thereof, and mechanism operating to cause all of the aforesaid means to perform their functions uninterruptedly during one cycle of operation of the apparatus.

3. In an apparatus for completely shaping by plastic deformation and by a continuous cycle of operation, an object from a work-piece having a volume of material substantially equal to the volume of material in the finished product, a die, means for piercing the material in said die and hollowing out or initiating a tubular formation having a closed end, solely by expansion of the material, a separate drawing die, means for presenting the tubular formation to said drawing die, means for forcing the said formation through said drawing die to impart to the product its final shape, the first said means subsequently operating upon another initial supply of material to produce another tubular formation, whereby upon each step of operation of the machine, subsequent to the production of the first tubular formation, a completed article will be produced, and mechanism operating to cause all of the aforesaid means to perform their functions uninterruptedly during one cycle of operation of the apparatus.

4. An apparatus for shaping by continuous operation in the same machine, objects by plastic deformation of a billet having a volume of material substantially equal to the volume in the finished product, in a plurality of successive stages, means for deforming the billet at one station by pressure thereupon to expand the material radially, means for moving the thus expanded billet to another station, and means for subjecting the billet to a drawing operation at the last station to draw the same, the deforming and drawing operations upon the billets being performed by pressure exerted from within the body thereof, and mechanism whereby all of the aforesaid operations will be performed uninterruptedly in the same apparatus and during one cycle of operation of the later.

5. An apparatus for shaping by continuous operation in the same machine, objects by plastic deformation of a billet in a plurality of successive stages, embodying a shiftable turret provided with a plurality of work holders for successively receiving a billet, means to shift said turret to move the holders to a plurality of different positions, a slide, a plurality of tools less in number than said holders mounted on said slide, each arranged in alinement with one of said holders in any of the shifted positions of said turret for an expanding operation upon the billet in the respective holder as the slide moves toward the turret, a drawing die, means for removing the billet from its holder, means for positioning the removed billet with respect to said drawing die, means for forcing the said billet through the said drawing die to draw the same and to impart to the billet its final shape, and means separate from the turret rotating means for positioning and locking the turret in position.

6. An apparatus for shaping objects by plastic deformation of a billet in a plurality of successive stages in the same machine, embodying a shiftable turret provided with a plurality of like holders for successively receiving a billet, means to shift said turret to move said holders to a plurality of different positions, a reciprocable slide, a plurality of tools less in number than said holders mounted on said slide, each arranged in alinement with one of said holders in any of the shifted positions of said turret for expanding the material by a pressing operation upon the billet in the respective holder as the slide moves toward said turret, a drawing die, means for removing the billet from its holder, means for positioning the removed billet with respect to said drawing die, means for forcing the said billet through the said drawing die to draw the material and to impart thereto its final shape, and a common actuating means for said tools and the said means which forces the billet through said drawing die, a portion of one of said tools entering one of the work holders to lock said turret in operative position.

7. In an apparatus for shaping by continuous operation in the same machine, objects by plastic deformation of a billet in a plurality of successive stages, embodying a shiftable turret provided with a plurality of like holders for successively receiving a billet, means to shift said turret to move said holders to a plurality of different positions, a reciprocable slide, a plurality of tools less in number than said holders mounted on said slide, each arranged in alinement with one of said holders in any of the shifted positions of said turret and for a pressing and expanding operation upon the billet in the respective holder as the slide moves towards said turret, a drawing die, means for removing the billet from its holder, means for positioning the removed billet with respect to said drawing die, means for forcing said billet through the said drawing die to draw the material and to impart thereto its final shape, and a common actuating means for the said tools and the said means which forces the billet through the drawing die, the full power of said actuating means being exerted upon the billet and during each step of operation thereupon.

8. In an apparatus for shaping objects by plastic deformation of a billet in a plurality of successive stages, embodying a shiftable turret provided with a plurality of like holders for successively receiving the billet, means to shift said turret to move said holders to a plurality of different positions, a reciprocable slide, a plurality of tools less in number than said holders mounted on said slide, each arranged in alinement with one of said holders in any of the shifted positions of said turret for a pressing and expanding operation upon the billet in the respective holder as the slide moves toward said turret, a drawing die, means for removing the billet from its holder, means for positioning the removed billet with respect to said drawing die, means for forcing the said billet through said drawing die to draw the material and to impart thereto its final shape, and means operating in synchronism with the operations upon the billet in some of the said holders for preparing others of said holders for subsequent operations therein.

9. In an apparatus for shaping objects by plastic deformation of a work piece in a plurality of successive stages, embodying a shiftable turret provided with a plurality of like holders for successively receiving a piece of work, means to shift said turret to move said holders to a plurality of different positions, a reciprocable slide, a plurality of tools less in number than said holders mounted on said slide, each arranged in alinement with one of said holders in any of the shifted positions of said turret for a pressing operation upon the work in the respective holder as the slide moves toward said turret, a drawing die, means for removing the work from its holder, means for positioning the removed work with respect to said drawing die, means for forcing the work through said drawing die to impart its final shape thereto, and means operating in synchronism with the operations upon the work in some of the said holders for preparing others of said holders for subsequent operations therein, the last recited means embodying provisions for cleaning, cooling and lubricating said holders.

10. In an apparatus for shaping by continuous operation in the same machine, objects from a billet by plastic deformation of the billet, embodying a plurality of blank holders successively movable to a loading station, means for moving said holders step by step to bring them successively into registry with a plurality of tools, a common actuating means for reciprocating said tools, one of said tools operating to insert the billet into a holder and another of the tools being forced into the material to expand the billet in the holder, by pressure, a drawing die, means for ejecting the billet from the holder, and means for forcing the shaped billet through the drawing die to draw the material.

11. An apparatus for shaping objects from a billet by plastic deformation of the work piece, embodying a plurality of blank holders successively movable to a loading station, means for moving said holders step by step to bring them successively into registry with a plurality of tools, a common actuating means for reciprocating said tools, one of said tools operating to insert the billet into a holder and another of the tools operating to expand the billet in the holder, by pressure, by being forced into the billet, a drawing die, means for ejecting the expanded billet from its holder, means for forcing the shaped billet through said drawing die to draw the material, and means operating in unison with the forming and drawing of the billet for cleaning and lubricating others of said holders for subsequent operations upon the billet.

12. An apparatus for shaping by continuous operation in the same machine, objects from a billet by plastic deformation of the billet, embodying a plurality of open-ended work holders successively movable to a loading station, means for moving said holders step by step to bring them successively into registry with a plurality of tools, a common actuating means for reciprocating said tools, one of said tools movable into position to close the bottom of the work holder and also operating to insert the billet into the holder and another of the tools operating to expand the billet by pressure, by being forced into the billet while in its holder, a drawing die, means for ejecting the billet from its holder, and means for forcing the shaped billet through said drawing die to draw the material, said work holders being disposed in a rotatable turret, the said bottom closing means also operating to position said turret to center the work holders with relation to the respective tools upon each step of movement of the turret and for locking the turret against movement during the reciprocation of said tools.

13. In an apparatus for shaping by continuous operation in the same machine, objects from a billet by plastic deformation of the billet, embodying a plurality of billet holders successively movable to a loading station, means for moving said holders step by step to bring them successively into registry with a plurality of tools, a common actuating means for reciprocating said tools, one of said tools operating to insert the billet into a holder and another of said tools operating to expand the billet by pressure, by being forced into the billet while the latter is in its holder, a drawing die, means for ejecting the billet from its holder, means for forcing the shaped billet through the drawing die to draw the material, said billet holders being disposed in a rotatable turret, means for positioning said turret to center the billet holders with relation to the respective tools upon each step of movement of the turret and for locking the turret against movement during the reciprocation of said tools, the said billet holders having an open bottom, the last recited means embodying a reciprocable plunger, the end of said plunger operating as said positioning and locking means and also serving as the bottom of the billet holder.

14. An apparatus for shaping by continuous operation in the same machine, objects from a billet by plastic deformation of the billet, embodying a rotatably mounted turret, a plurality of billet holders carried by said turret, a slide, a plurality of tools carried by said slide, means for intermittently rotating said turret to bring the billet holders successively into register with said tools, one of said tools operating to expand the billet by pressure, by being forced into the billet in the respective holder, means for ejecting the deformed billet from its holder, a drawing die to which the expanded billet is presented after it is removed from its holder, a tool for forcing the billet through said drawing die to draw the material, and a common actuating means for all of said tools for operating them in unison.

15. An apparatus for shaping objects from a billet by plastic deformation of the billet, embodying a rotatably mounted turret, a plurality of work holders carried by said turret, a slide, a plurality of tools carried by said slide, means for intermittently rotating said turret to bring the work holders successively into registry with said tools, one of said tools operating to expand the billet by being forced into the billet in the respective holder, means for ejecting the billet from its holder, a drawing die to which the expanded billet is presented after it is removed from its holder, a tool for forcing the billet through the said drawing die to draw the material, a common actuating means for all of said tools for operating them in unison, and means separate from the turret rotating means and responsive to the operation of one of the work forming means for locking said turret after each step of its movement and for releasing the turret.

16. In an apparatus for shaping by continuous operation in the same machine, objects from a billet by plastic deformation of the billet, embodying a rotatably mounted turret, a plurality of work holders carried by said turret, a slide, a plurality of tools carried by said slide, means for intermittently rotating said turret to bring the work holders successively into register with said tools, one of said tools operating to expand the billet by being forced into the billet in the respective holder, means for ejecting the billet from its holder, a drawing die to which the expanded billet is presented after it is removed from its holder, a tool for forcing the billet through said drawing die to draw the material, and a common actuating means for all said tools, all of said tools operating in unison whereby upon completion of each cycle of operation of the apparatus a completed article will be produced.

17. An apparatus for shaping by continuous operation in the same machine, objects from a billet by plastic deformation of the billet, embodying a turret, a plurality of work holders carried thereby, a slide, a plurality of tools carried by said slide, means for intermittently and rotatably displacing said turret and said tools one with relation to the other, to cause the work holders and tools to successively register, one of said tools operating to expand the billet by forcing the tool into the billet by a continuous pressure, means for ejecting the billet from its holder, a drawing die to which the expanded billet is presented after its removal from its holder, a tool for forcing the billet through the drawing die to draw the material, and a common actuating means for all of said tools for operating them in unison.

18. An apparatus for shaping by continuous operation in the same machine, objects from a billet by plastic deformation of the billet, embodying a turret, a plurality of work holders carried thereby, a slide, a plurality of tools carried by said slide, means for intermittently and rotatably displacing said turret and said tools one with relation to the other, to cause the work holders and tools to successively register, one of said tools operating to expand the billet by forcing the tool into the billet by a continuous pressure, means for ejecting the billet from its holder, a second turret, a plurality of drawing dies carried by said second turret, and to which dies the billet is respectively presented after its expansion and removal from its holder, a second slide, a tool carried by said second slide for forcing the billet through one of the drawing dies, means for rotatably displacing the said second turret and its co-operating tool one with relation to the other to cause the billet to be positioned with relation to the drawing tool to be forced by the last said tool through the drawing die, a common actuating means for said slides, and means operating to rotate said turrets in unison, all of said tools being simultaneously reciprocated and operating to simultaneously perform different steps of operation on a billet.

19. An apparatus for shaping objects from a billet by plastic deformation of the billet, embodying a turret, a plurality of work holders carried thereby, a slide, a plurality of tools carried by said slide, means for intermittently and rotatably displacing said turret and said tools one with relation to the other, to cause the work holders and tools to successively register, one of said tools operating to expand the billet by being forced into the billet by a continuous pressure, means for ejecting the billet from its holder, a second turret, a plurality of drawing dies carried by said second turret, and to which drawing dies the expanded billet is respectively presented after its removal from its holder, a second slide, a tool carried by said second slide for forcing the billet through one of the drawing dies, means for rotatively displacing the said second turret and its co-operating tool one with relation to the other to cause the billet to be positioned with relation to the drawing tool to be forced by the last said tool through the drawing die, a common actuating means for said slides, and means operating to rotate said turrets in unison; said turrets being disposed and operating in the same plane.

20. An apparatus for shaping by continuous operation in the same machine, objects from a billet by plastic deformation of the billet, embodying a turret, a plurality of work holders carried thereby, a slide, a plurality of tools carried by said slide, means for intermittently and rotatively displacing said turret and said tools one with relation to the other, to cause the work holders and tools to successively register, one of said tools operating to expand the billet by being forced into the billet by a continuous pressure, means for ejecting the billet from its holder, a second turret, a plurality of drawing dies carried by said second turret, and to which drawing dies the billet is respectively presented after its removal from its holder, a second slide, a tool carried by said second slide for forcing the billet through one of the drawing dies, means for rotatively displacing the said second turret and its co-operating tool one with relation to the other to cause the billet to be positioned with relation to the drawing tool to be forced by the last said tool through the drawing die, a common actuating means for said slides, means operating to rotate said turrets in unison, said turrets being disposed and operating in different planes, a portion of one turret overlapping a portion of the other turret, the said drawing tool also operating to deliver the deformed billet from its holder into the drawing die, and means independent of said rotating means for positioning and locking one of the turrets in operative position with respect to the tool.

21. An apparatus for shaping objects from a billet by plastic deformation of the billet, embodying a turret, a plurality of work holders carried thereby, a slide, a plurality of tools carried by said slide, means for intermittently and rotatively displacing said turret and said tools one with relation to the other, to cause the work holders and tools to successively register, one of said tools operating to expand the billet by being forced into the billet by a continuous pressure, means for ejecting the billet from its holder, a drawing die to which the billet is presented after its removal from its holder, a tool for forcing the billet through the drawing die, and a common actuating means for all of said tools for operating them in unison, the said ejecting means being responsive in its operation to the operation of the said actuating means.

22. An apparatus for shaping objects from a billet by plastic deformation of the billet, embodying a rotatably mounted turrent, a plurality of work holders carried thereby, a slide, a plurality of tools carried by the slide, means for intermittently and rotatively displacing said turret with relation to said tools to cause the work holders to successively register with the tools, one of said tools operating to expand the billet by being forced thereinto by a continuous pressure, means for ejecting the billet from its holder, a drawing die to which the expanded billet is presented after its removal from its holder, a tool for forcing the billet through the drawing die, common actuating means for all of said tools for operating them in unison, and means for positioning and locking said turret upon the completion of each movement thereof, the last recited means operating with a dwell in its movement.

23. An apparatus for shaping by continuous operation in the same machine, objects from a billet by plastic deformation of the billet, embodying a rotatably mounted turret, a plurality of work holders carried thereby, a slide, a plurality of tools carried by the slide, means for intermittently and rotatively displacing said turret with relation to said tools to cause the work holders to successively register with the tools, one of said tools operating to expand the billet by being forced into the billet by a continuous pressure, a drawing die to which the billet is automatically presented after its removal from its holder, a tool for forcing the billet through the drawing die, common actuating means for all of said tools for operating them in unison, and means separate from the turret actuating means for positioning and locking the turret upon the completion of each movement thereof, the last recited means operating with a dwell in its movement and embodying toggle mechanism responsive in its operation to the operation of said actuating means.

24. An apparatus for shaping objects from a billet by plastic deformation of the billet, embodying a work holder, a tool for expanding the billet in said holder by being forced into the billet by a continuous pressure thereupon, means for removing the billet from its holder, a drawing die to which the billet is presented, a tool for forcing said billet through said drawing die, an actuating shaft, and operative connections between said shaft and the said tools for reciprocating the latter, whereby the full force of the power of said shaft will be utilized at each station during each step of operation upon the billet.

25. An apparatus for shaping objects from a billet by plastic deformation of the billet, embodying a rotatable turret, a plurality of work holders carried thereby, a tool for expanding the billet in one of said holders by being forced into the billet with a continuous pressure, said work holders being arranged concentrically about the axis of said turret, means for intermittently rotating said turret, means for removing the billet from its holder, a drawing die to which the removed billet is presented, a tool for forcing the billet through said die, means common to said tools for reciprocating them whereby the full force of the last said means will be utilized at each station during each step of operation upon the billet, and means operable upon certain of said work holders for cleaning and lubricating them for future operation with respect to the work, and while the billet is being operated upon in another of said holders.

26. An apparatus for shaping objects from a billet by plastic deformation of the billet, embodying a rotatable turret, a plurality of work holders carried thereby, a tool for expanding the billet in one of said holders by being forced into the billet with a continuous pressure, said work holders being arranged concentrically about the axis of said turret, means for intermittently rotating said turret, means for removing the billet from its holder, a drawing die to which the removed deformed billet is presented, a tool for forcing the billet through said drawing die, means common to said tools for reciprocating them, whereby the full force of the last said means will be utilized at each station during each step of operation upon the billet, and means operable upon certain of said work holders for cleaning and lubricating them for future operation with respect to the work and while the billet is being operated upon in another of said holders, the said turret rotating on a vertical axis, and the work holders which are being cleaned and lubricated being disposed in a plane lower than the plane of the work holders which contain the billet being operated upon.

27. An apparatus for shaping by continuous operation in the same machine, objects by plastic deformation of a billet having a volume of material substantially equal to the volume in the finished product, means for expanding the billet at one station by pressure thereupon by a tool being forced into the billet, means for moving the billet to another station, means for subjecting the billet to a drawing operation at the last said station, means for feeding the billet to the apparatus and mechanism operating to cause all of the aforesaid means to operate simultaneously on billets and all during one cycle of operation of the apparatus.

HERMAN FINZEL.
HEINRICH MAYKEMPER.